United States Patent
Nadayoshi et al.

(10) Patent No.: US 12,123,485 B2
(45) Date of Patent: Oct. 22, 2024

(54) DIFFERENTIAL GEAR

(71) Applicant: AISIN CORPORATION, Aichi (JP)

(72) Inventors: Kaoru Nadayoshi, Kariya (JP); Kohei Ito, Kariya (JP)

(73) Assignee: AISIN CORPORATION, Aichi (JP)

( * ) Notice: Subject to any disclaimer, the term of this patent is extended or adjusted under 35 U.S.C. 154(b) by 0 days.

(21) Appl. No.: 18/030,005

(22) PCT Filed: Oct. 6, 2021

(86) PCT No.: PCT/JP2021/036954
§ 371 (c)(1),
(2) Date: Apr. 3, 2023

(87) PCT Pub. No.: WO2022/102290
PCT Pub. Date: May 19, 2022

(65) Prior Publication Data
US 2023/0407954 A1  Dec. 21, 2023

(30) Foreign Application Priority Data
Nov. 12, 2020  (JP) .................................. 2020-188440

(51) Int. Cl.
*F16H 48/00* (2012.01)
*F16H 48/08* (2006.01)
(Continued)

(52) U.S. Cl.
CPC ............. *F16H 48/08* (2013.01); *F16H 48/40* (2013.01); *F16H 57/0424* (2013.01); *F16H 57/0483* (2013.01); *F16H 2048/087* (2013.01)

(58) Field of Classification Search
CPC ...... F16H 48/08; F16H 48/40; F16H 57/0424; F16H 57/0483; F16H 2048/08
See application file for complete search history.

(56) References Cited

U.S. PATENT DOCUMENTS 3,533,488 A  10/1970 Engle et al.
2007/0225103 A1  9/2007 Veldman et al.
(Continued)

FOREIGN PATENT DOCUMENTS

CN  110529578 A  12/2019
JP  6390786 B2  9/2018
(Continued)

OTHER PUBLICATIONS

International Search Report for PCT/JP2021/036954 dated Dec. 7, 2021.
(Continued)

*Primary Examiner* — Zakaria Elahmadi
(74) *Attorney, Agent, or Firm* — Sughrue Mion, PLLC

(57) ABSTRACT

The present disclosure provides a differential gear to be mounted on a vehicle, including a pair of side gears, at least two pinion gears meshed with the side gears, and a differential case that houses the side gears and the at least two pinion gears. Lubricating oil is supplied to and discharged from the inside of the differential case via an opening portion. The differential case includes at least two seat surfaces formed on the inner peripheral surface of the differential case so as to support the pinion gears, weir portions provided between the adjacent seat surfaces and extending in a direction along the rotational direction of the differential case to connect between the adjacent seat surfaces, and an oil reservoir portion formed on the inner peripheral surface by the weir portions so as to be positioned on the opposite side, in the axial direction of the side gears, of the opening portion from the weir portions. Consequently, it is possible to render the differential gear compact by suppressing a shortage of lubricating oil for a sliding portion well.

3 Claims, 4 Drawing Sheets

(51) Int. Cl.
*F16H 48/40* (2012.01)
*F16H 57/04* (2010.01)

(56) References Cited

U.S. PATENT DOCUMENTS

| | | | | |
|---|---|---|---|---|
| 2018/0038475 | A1* | 2/2018 | Nadayoshi | .............. F16H 48/08 |
| 2019/0003571 | A1* | 1/2019 | Okumoto | ................ F16H 48/40 |
| 2019/0170241 | A1* | 6/2019 | Nakamura | .......... F16H 57/0483 |
| 2022/0349464 | A1 | 11/2022 | Fukasawa et al. | |
| 2023/0407954 | A1* | 12/2023 | Nadayoshi | .............. F16H 48/40 |

FOREIGN PATENT DOCUMENTS

| | | | |
|---|---|---|---|
| JP | 2019-11849 | A | 1/2019 |
| JP | 6625778 | B1 | 12/2019 |

OTHER PUBLICATIONS

Extended European Search Report issued Apr. 15, 2024 in European Application No. 21891537.9.

* cited by examiner

DIFFERENTIAL GEAR

CROSS REFERENCE TO RELATED APPLICATIONS

This application is a National Stage of International Application No. PCT/JP2021/036954 filed Oct. 6, 2021, claiming priority based on Japanese Patent Application No. 2020-188440 filed Nov. 12, 2020, the entire contents of which are incorporated herein by reference.

TECHNICAL FIELD

The present disclosure relates to a differential gear to be mounted on a vehicle.

BACKGROUND ART

There has hitherto been known a differential gear of this type, including a pair of pinion gears, a pair of side gears meshed with the pinion gears, and a differential case that houses the pinion gears and the side gears and that includes a pinion shaft hole through which a pinion shaft that supports the pinion gears is inserted and drive shaft holes through which drive shafts to which the side gears are fixed are inserted (see Patent Document 1, for example). The differential case of the differential gear includes a single oil hole for supplying hydraulic oil that serves as lubricating oil into the differential case, the oil hole being formed so as to be positioned on the radially outer side with respect to side washers disposed between the side gears and the differential case. Further, an oil outflow regulation member is disposed inside the differential case, and extends to the radially inner side with respect to the outer periphery of the side washers to reserve oil in the differential case to the radially inner side with respect to the oil hole. This makes it possible to smoothly supply hydraulic oil into the differential case through the oil hole, and to supply hydraulic oil to the side washers irrespective of the rotational state of the differential case.

RELATED ART DOCUMENTS

Patent Documents

Patent Document 1: Japanese Patent No. 6390786 (JP 6390786 B)

SUMMARY OF THE DISCLOSURE

Problem to be Solved by the Various Aspects of the Disclosure

When the vehicle starts to travel etc., however, the oil level in the differential case is lowered as an oil pump starts suctioning hydraulic oil. Therefore, lubricating oil in the differential case may be insufficient and a sliding portion may not be adequately lubricated or cooled, even if an oil outflow regulation member is disposed in the differential case, as with the differential gear according to the related art described above.

It is therefore a main object of the present disclosure to render a differential gear compact by suppressing a shortage of lubricating oil for a sliding portion well.

Means for Solving the Problem

The present disclosure provides a differential gear to be mounted on a vehicle, including a pair of side gears, at least two pinion gears meshed with the side gears, and a differential case that houses the side gears and the at least two pinion gears, lubricating oil being supplied to and discharged from an inside of the differential case via an opening portion, in which the differential case includes at least two seat surfaces formed on an inner peripheral surface of the differential case so as to support the pinion gears, weir portions provided between the adjacent seat surfaces and extending in a direction along a rotational direction of the differential case to connect between the adjacent seat surfaces, and an oil reservoir portion formed on the inner peripheral surface by the weir portions so as to be positioned on an opposite side, in an axial direction of the differential case, of the opening portion from the weir portions.

The present disclosure provides a differential gear to be mounted on a vehicle, including a pair of side gears, at least two pinion gears meshed with the side gears, and a differential case that houses the side gears and the at least two pinion gears. Lubricating oil is supplied to and discharged from the inside of the differential case via an opening portion. The differential case includes at least two seat surfaces formed on the inner peripheral surface of the differential case so as to support the pinion gears, weir portions provided between the adjacent seat surfaces and extending in a direction along the rotational direction of the differential case to connect between the adjacent seat surfaces, and an oil reservoir portion formed on the inner peripheral surface by the weir portions so as to be positioned on the opposite side, in the axial direction of the differential case, of the opening portion from the weir portions. Consequently, lubricating oil is secured in the oil reservoir portion when the oil level in the differential case is lowered, and it is possible to distribute lubricating oil in the oil reservoir portion to a sliding portion between the pinion gears and the seat surfaces etc. through rotation of the differential case. As a result, an increase in the surface pressure at the sliding portion can be handled by suppressing a shortage of lubricating oil for the sliding portion well, and thus it is possible to render the differential gear compact.

MODES FOR CARRYING OUT VARIOUS ASPECTS OF THE DISCLOSURE

Now, a mode for carrying out the aspects of the present disclosure will be described with reference to the drawings.

Figure 1:
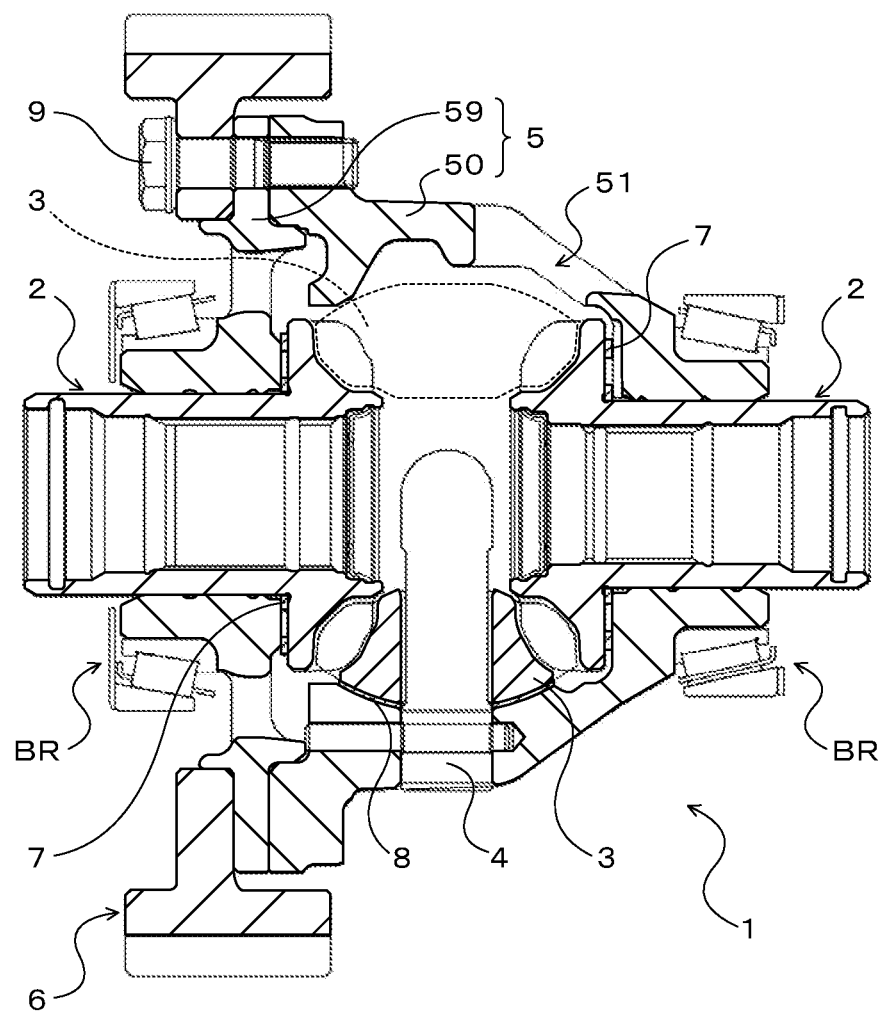
FIG. 1 is a sectional view illustrating a differential gear according to the present disclosure.

FIG. 1 is a schematic view illustrating the configuration of a differential gear 1 according to the present disclosure. The differential gear 1 illustrated in the drawing is to be mounted on a front-wheel drive vehicle, for example, to transfer power from a transmission (not illustrated) to right and left drive wheels (not illustrated). As illustrated in FIG. 1, the differential gear 1 includes a pair of (two) side gears 2 fixed to respective corresponding drive shafts (not illustrated), a pair of (two) pinion gears 3 meshed with the side gears 2 at right angles, a pinion shaft 4 that supports the pinion gears 3, a differential case 5 that houses the side gears 2 and the pinion gears 3, and a differential ring gear 6 fixed (coupled) to the differential case 5.

The side gears 2 and the pinion gears 3 are each a straight bevel gear. A side washer 7 is disposed between each of the side gears 2 and the differential case 5. A pinion washer 8 is disposed between each of the pinion gears 3 and the differential case 5. The differential case 5 is supported by a transmission case (not illustrated) so as to be rotatable coaxially with the drive shaft via a bearing BR. In the present embodiment, the differential gear 1 is disposed in a differential chamber defined in proximity to a hydraulic oil reservoir chamber formed at a lower portion in the transmission case.

The differential case 5 of the differential gear 1 includes a case body 50 that rotatably supports one of the side gears 2, and a cover 59 that rotatably supports the other of the side gears 2. In the present embodiment, the case body 50 and the cover 59 are each a cast article made of metal. A plurality of bolt holes is formed in each of a flange portion formed at the outer peripheral portion of the case body 50 and the outer peripheral portion of the cover 59. The case body 50 and the cover 59 are coupled (fixed) to each other via a plurality of bolts 9 screwed into the corresponding bolt holes of the case body 50 and the cover 59, and coupled (fixed) to a differential ring gear 6 via the bolts 9.

Figure 2:
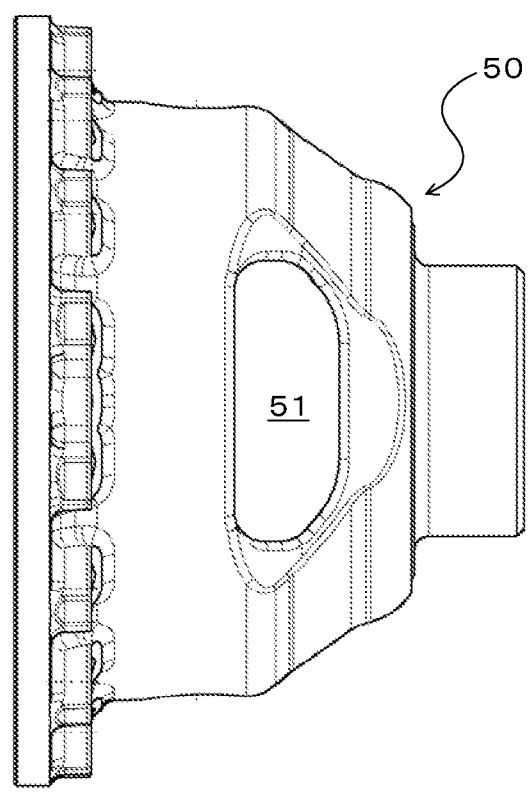
FIG. 2 is a side view illustrating a case body that constitutes a differential case for the differential gear according to the present disclosure.
Figure 3:
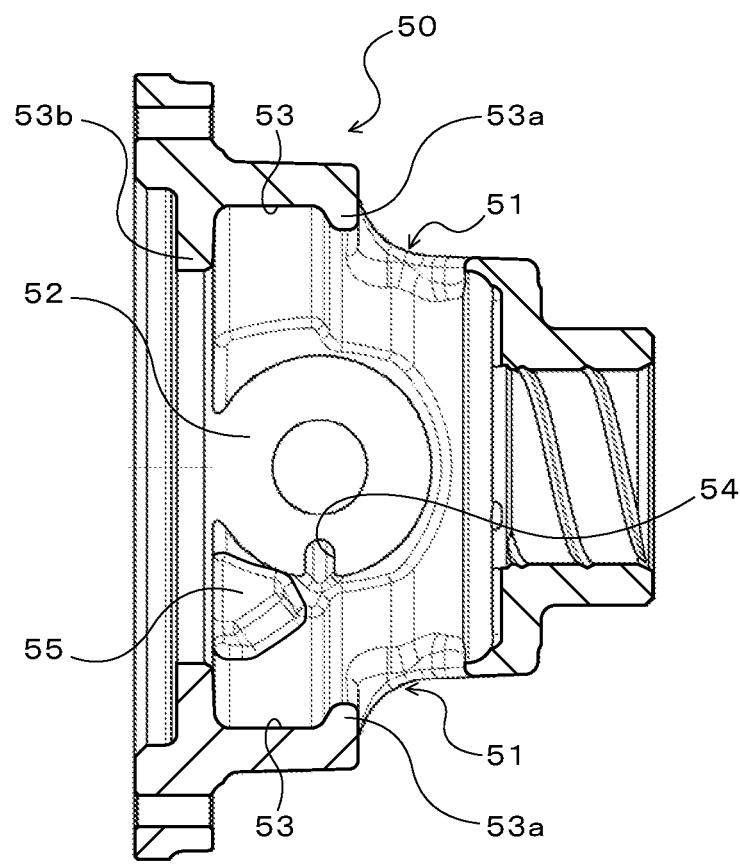
FIG. 3 is a partial sectional view illustrating the case body that constitutes the differential case for the differential gear according to the present disclosure.

As illustrated in FIGS. 2 and 3, the case body 50 of the differential case 5 includes a plurality of (two in the present embodiment) opening portions (window portions) 51 mainly for supplying and discharging hydraulic oil that serves as lubricating oil, formed at intervals in the rotational direction of the differential case 5. During travel of the vehicle including the differential gear 1, hydraulic oil reserved in the differential chamber is splashed by the differential ring gear 6 to be supplied into the differential case 5 through the opening portions 51, or hydraulic oil is dripped from a supply pipe etc. (not illustrated) into the differential case 5 through the opening portions 51. In the present embodiment, the opening portions 51 have an opening area that is at least not enough to allow the pinion gears 3 to be substantially inserted therethrough, and are not used for assembly of the pinion gears 3 etc. to the differential case 5, for example. The torsional rigidity of a torque transfer portion of the differential case 5 can be enhanced by reducing the opening area of the opening portions 51 in this manner.

Figure 4:
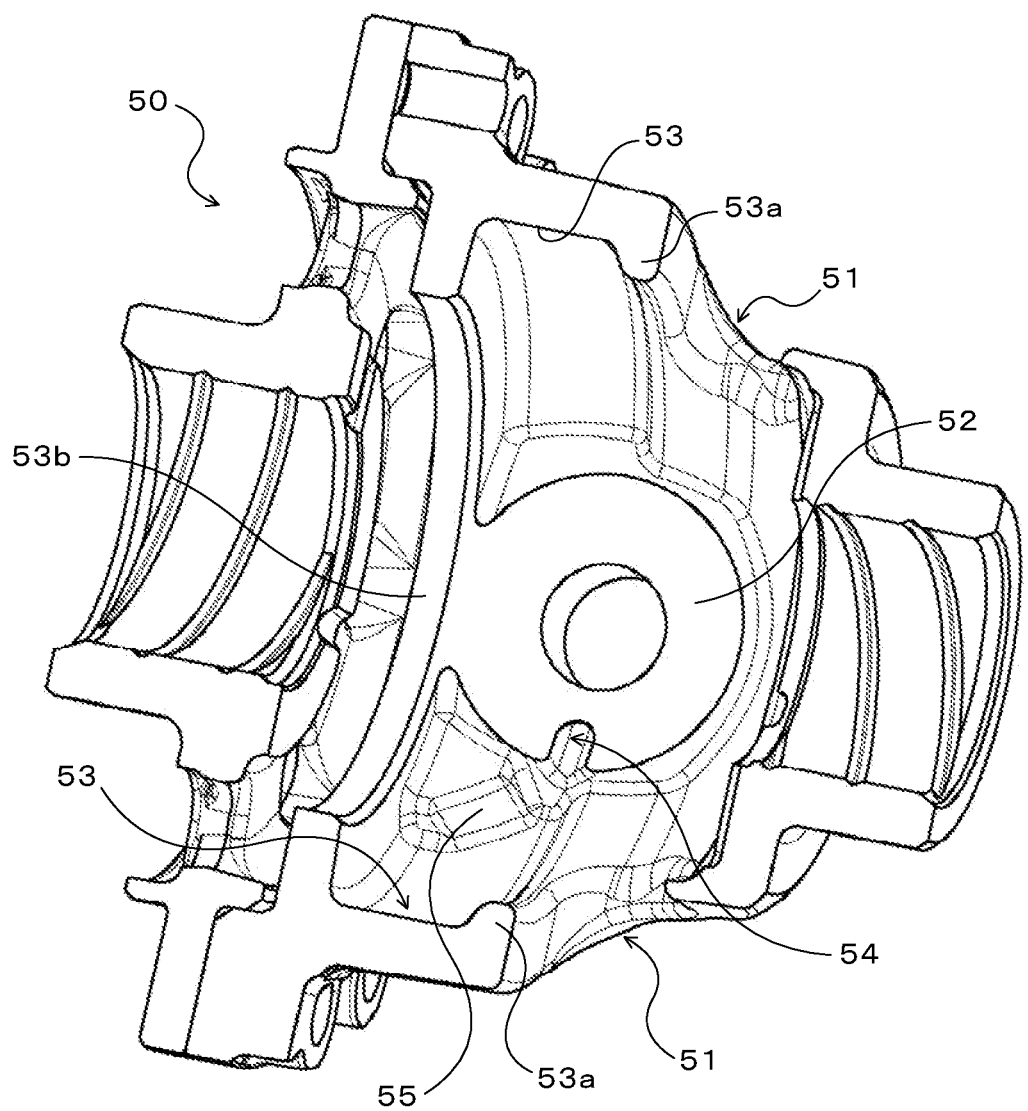
FIG. 4 is an enlarged perspective view illustrating an essential portion of the case body that constitutes the differential case for the differential gear according to the present disclosure.

As illustrated in FIGS. 3 and 4, a plurality of (two in the present embodiment) seat surfaces 52 that support (receive) the respective corresponding pinion gears 3 are formed on the inner peripheral surface of the case body 50 of the differential case 5. The seat surfaces 52 are each formed in a concave spherical shape by cutting. The pinion washer 8 is disposed between each of the seat surfaces 52 and the back surface of the corresponding pinion gear 3. Further, a plurality of (two in the present embodiment) weir portions (ribs) 53a and an annular weir portion (rib) 53b are formed by casting on the inner peripheral surface of the case body 50.

The weir portions (first weir portions) 53a project toward the side of the axis of the case body 50 (radially inner side) around the center portion, in the axial direction of the side gears 2 (differential case 5), of the case body 50, and extend in a direction along the rotational direction of the differential case 5 (side gears 2) between adjacent seat surfaces 52 along the opening portions 51. The annular weir portion (second weir portion) 53b projects toward the side of the axis of the case body 50 (radially inner side) on the opposite side, in the axial direction of the side gears 2, of the opening portions 51 from the weir portions 53a, that is, at an end portion of the case body 50 on the cover 59 (differential ring gear 6) side, and extends in a direction along the rotational direction of the differential case 5. Further, the weir portion 53b faces the weir portions 53a with a space therebetween in the axial direction of the side gears 2. Consequently, the case body 50 (differential case 5) includes a plurality of (two in the present embodiment) oil reservoir portions 53 that extends in a direction along the rotational direction of the differential case 5 between adjacent seat surfaces 52, defined by the weir portions 53a on the opening portions 51 side and the annular weir portion 53b on the differential ring gear 6 side. That is, the oil reservoir portions 53 are positioned on the opposite side, in the axial direction of the side gears 2 (differential case 5), of the opening portions 51 from the weir portions 53a to be more proximate to the differential ring gear 6 than the opening portions 51, and formed on the inner peripheral surface so as to be dented toward the outer peripheral surface of the case body 50 (differential case 5) with respect to the seat surfaces 52. The oil reservoir portions 53 are formed in the case body 50 such that the weir portion 53b, the oil reservoir portions 53, the weir portions 53a, and the opening portions 51 are arranged in this order from the differential ring gear 6 side.

As illustrated in FIGS. 3 and 4, one oil introduction port 54 is formed in each of the seat surfaces 52. The oil introduction port 54 in each of the seat surfaces 52 communicates with the corresponding oil reservoir portion 53 and at least partially overlaps the pinion washer 8 as seen in the axial direction of the pinion gear 3 on the front side (lower side in FIG. 3) in the rotational direction of the side gears 2 (drive shafts) at the time when the vehicle including the differential gear 1 travels forward. The oil introduction port 54 is formed in the case body 50 on the opposite side of the differential ring gear 6 side so as to be proximate to the center of the corresponding seat surface 52 in the axial direction of the differential case 5.

Further, the oil reservoir portion 53 in the differential case 5 (the inner peripheral surface of the case body 50) includes a guide portion 55 formed by casting to guide hydraulic oil in the oil reservoir portion 53 to the corresponding oil introduction port 54. The guide portion 55 is a projecting portion that projects toward the side of the axis of the case body 50 (radially inner side) from the bottom surface of the oil reservoir portion 53 so as to gradually narrow the oil reservoir portion 53 in the axial direction of the side gears 2 (differential case 5) as the guide portion 55 extends toward the oil introduction port 54 away from the differential ring gear 6 in the axial direction of the differential case 5. While the oil introduction port 54 is formed so as to extend straight toward the axis of the pinion shaft 4 along the rotational direction of the differential case 5 in the present embodiment, this is not limiting. That is, the oil introduction port 54 may be inclined with respect to the rotational direction of the differential case 5, or may be formed so as to be displaced in the axial direction of the side gears 2 (drive shafts) with respect to the axis of the pinion shaft 4, or may extend so as to be curved (bent), as long as the oil introduction port 54 communicates with the oil reservoir portion 53.

In the differential gear 1 configured as described above, hydraulic oil that serves as lubricating oil is supplied into the differential case 5 via the opening portions 51 during travel of the vehicle, and a part of the hydraulic oil supplied into the differential case 5 is reserved in the oil reservoir portions 53 positioned below when travel of the vehicle is stopped. Consequently, hydraulic oil that serves as lubricating oil can be secured in the oil reservoir portions 53 of the differential case 5, even if the oil level in the differential chamber and the differential case 5 is lowered as an oil pump suctions hydraulic oil in a hydraulic oil reservoir chamber in the transmission case when the vehicle starts to travel.

Thus, it is possible to distribute hydraulic oil in the oil reservoir portions 53 to a sliding portion between the side gears 2 and the differential case 5, between the pinion gears 3 and the seat surfaces 52, etc. through rotation of the differential case 5, even if hydraulic oil splashed by the differential ring gear 6 or supplied into the differential case 5 through a supply pipe is insufficient when the vehicle starts to travel. As a result, an increase in the surface pressure at the sliding portion can be handled by suppressing a shortage of lubricating oil for the sliding portion well, and thus it is possible to render the differential gear 1 compact by reducing the diameter of the side gears 2, for example. That is, a sufficient amount of hydraulic oil (lubricating oil) can be secured in the differential case during operation of the differential gear 1, that is, during travel of the vehicle, even if the area of a sliding portion around the side gears 2 and the pinion gears 3 etc. is decreased by rendering the differential gear 1 compact. Thus, an increase in the surface pressure at the sliding portion can be handled well. Additionally, the weir portions 53a, 53b for defining the oil reservoir portions 53 in the case body 50 also function as ribs, and thus it is possible to further improve the strength of the differential case 5 and hence the differential gear 1.

The oil introduction port 54 is formed in each of the seat surfaces 52 of the differential case 5, and communicates with the corresponding oil reservoir portion 53 on the front side in the rotational direction of the differential case 5 (side gears 2) at the time when the vehicle travels forward, and at least partially overlaps the pinion washer 8 as seen in the axial direction of the pinion gears 3. That is, the oil introduction port 54 is formed only on the front side, in the rotational direction of the differential case 5 at the time when the vehicle travels forward, with respect to the seat surface 52, and not formed on the rear side of the seat surface 52 against which a portion of the pinion washer 8 on the rear side is pressed. Consequently, an increase in the surface pressure that acts on the seat surface 52 can be suppressed compared to the case where the oil introduction port 54 is formed on the rear side of the seat surface 52, and thus the durability of the seat surface 52 can be secured well, even if the surface pressure is increased with a portion of the pinion washer 8 on the rear side, in the rotational direction of the differential case 5, pressed against the seat surface 52 when the vehicle travels forward while accelerating. Thus, it is possible to lubricate and cool each seat surface 52 and the pinion washer 8 pressed against the seat surface 52 well by supplying a sufficient amount of hydraulic oil (lubricating oil) to a space between the pinion washer 8 and the seat surface 52 while securing the durability of the differential case 5 (case body 50) well by forming the oil introduction port 54 only on the front side, in the rotational direction of the differential case 5, of each seat surface 52. As illustrated in FIG. 3, the oil introduction port 54 is blocked so as not to communicate with the pinion shaft hole through which the pinion shaft 4 is inserted, and thus hydraulic oil guided to the oil introduction port 54 can be spilled out of the oil introduction port 54 to be efficiently supplied to a space between the seat surface 52 and the pinion washer 8. Further, the pinion shaft hole is not formed to have a notch for the oil introduction port 54, and thus it is possible to suppress a reduction in the strength of the pinion shaft hole.

In the differential gear 1, further, the differential ring gear 6 is fixed to the differential case 5, and the oil reservoir portions 53 are formed so as to be more proximate to the differential ring gear 6 than the opening portions 51 in the axial direction of the differential case 5. That is, the outside diameter of the differential case 5 is largest on the differential ring gear 6 side, and thus it is possible to secure a sufficient volume of the oil reservoir portions 53 by forming the oil reservoir portions 53 in the differential case 5 using the weir portions 53a, 53b so as to be proximate to the differential ring gear 6.

The case body 50 of the differential case 5 includes the guide portion 55 that guides hydraulic oil in the corresponding oil reservoir portion 53 to the oil introduction port 54 on the opposite side of the differential ring gear 6 side by gradually narrowing the oil reservoir portion 53 as the oil reservoir portion 53 extends away from the differential ring gear 6 in the axial direction of the side gears 2. Further, the oil introduction port 54 is formed in the differential case 5 so as to be proximate to the center of the corresponding seat surface 52 in the axial direction of the differential case 5. Consequently, it is possible to supply hydraulic oil that serves as lubricating oil to the periphery of the pinion gears 3, the pinion washers 8, and the seat surfaces 52 through the oil introduction port 54 by smoothly introducing hydraulic oil in the oil reservoir portions 53 to the oil introduction port 54 through rotation of the differential case 5. By offsetting the oil introduction port 54 from the center of the oil reservoir portions 53 in the axial direction of the differential case 5 toward the side of the center of the seat surface 52 in the axial direction, the differential case 5 can be rendered compact, compared to the case where the oil introduction port 54 is proximate to the center of the oil reservoir portions 53, while efficiently supplying hydraulic oil to the seat surface 52 and securing a sufficient area of the opening portions 51.

As described above, the present disclosure provides a differential gear 1 to be mounted on a vehicle, including a pair of side gears 2, two pinion gears 3 meshed with the side gears 2, and a differential case 5 that houses the side gears 2 and the two pinion gears 3, hydraulic oil that serves as lubricating oil being supplied to and discharged from the inside of the differential case 5 via the opening portions 51. The differential case 5 includes two seat surfaces 52 formed on the inner peripheral surface of the differential case 5 so as to support the pinion gears 3, weir portions 53a that extend in a direction along the rotational direction of the differential case 5 between adjacent seat surfaces 52 to connect between the adjacent seat surfaces 52, and an oil reservoir portion 53 formed on the inner peripheral surface by the weir portions 53a so as to be positioned on the opposite side of the opening portions 51, in the axial direction of the side gears 2, from the weir portions 53a.

Consequently, an increase in the surface pressure due to sliding can be handled by suppressing a shortage of lubricating oil well for a sliding portion between the side gears 2 and the differential case 5, between the pinion gears 3 and the seat surfaces 52, etc. As a result, it is possible to render the differential gear 1 compact.

The seat surfaces 52 of the case body 50 may each be additionally provided with an oil introduction port that communicates with the oil reservoir portion 53 on the rear side in the rotational direction of the differential case 5 at the time when the vehicle travels forward and that overlaps the pinion washer 8 as seen in the axial direction of the pinion gear 3, and may be provided with an oil introduction port formed only on the rear side in the rotational direction of the differential case 5. Further, the differential gear 1 may include three or more pinion gears 3 and seat surfaces 52.

Summary of Mode for Carrying Out the Various Aspects of the Disclosure

As has been described above, an embodiment of the present disclosure provides a differential gear (1) to be mounted on a vehicle, including a pair of side gears (2), at least two pinion gears (3) meshed with the side gears (2), and a differential case (5) that houses the side gears (2) and the at least two pinion gears (3), lubricating oil being supplied to and discharged from an inside of the differential case (5) via an opening portion (51), in which the differential case (5) includes at least two seat surfaces (52) formed on an inner peripheral surface of the differential case (5) so as to support the pinion gears (3), weir portions (53a) provided between the adjacent seat surfaces (52) and extending in a direction along a rotational direction of the differential case (5) to connect between the adjacent seat surfaces (52), and an oil reservoir portion (53) formed on the inner peripheral surface by the weir portions (53a) so as to be positioned on an opposite side, in an axial direction of the differential case (5), of the opening portion (51) from the weir portions (53a).

Such a differential gear is to be mounted on a vehicle, and includes a pair of side gears, at least two pinion gears meshed with the side gears, and a differential case that houses the side gears and the at least two pinion gears, lubricating oil being supplied to and discharged from the inside of the differential case via an opening portion. The differential case includes at least two seat surfaces formed on the inner peripheral surface of the differential case so as to support the pinion gears, weir portions provided between the adjacent seat surfaces and extending in a direction along the rotational direction of the differential case to connect between the adjacent seat surfaces, and an oil reservoir portion formed on the inner peripheral surface by the weir portions so as to be positioned on the opposite side, in the axial direction of the differential case, of the opening portion from the weir portions. Consequently, lubricating oil is secured in the oil reservoir portion when the oil level in the differential case is lowered, and it is possible to distribute lubricating oil in the oil reservoir portion to a sliding portion between the pinion gears and the seat surfaces etc. through rotation of the differential case. As a result, an increase in the surface pressure at the sliding portion can be handled by suppressing a shortage of lubricating oil for the sliding portion well, and thus it is possible to render the differential gear compact.

A pinion washer (8) may be disposed between a back surface of each of the pinion gears (3) and the seat surface (52), and an oil introduction port (54) may be formed in each of the seat surfaces (52), the oil introduction port (54) communicating with the oil reservoir portion (53) on a front side in the rotational direction of the differential case (5) at a time when the vehicle travels forward and at least partially overlapping the pinion washer (8) as seen in an axial direction of the pinion gear (3).

Consequently, the durability of the seat surfaces can be secured well, even if the surface pressure is increased with a portion of the pinion washer on the rear side, in the rotational direction of the differential case, pressed against the seat surface when the vehicle travels forward while accelerating. Thus, it is possible to lubricate and cool each seat surface and the pinion washer pressed against the seat surface well by supplying a sufficient amount of hydraulic oil (lubricating oil) to a space between the pinion washer and the seat surface while securing the durability of the differential case well by forming the oil introduction port only on the front side, in the rotational direction of the differential case, of each seat surface.

Further, a ring gear (6) may be fixed to the differential case (5), and the oil reservoir portion (53) may be formed in the differential case (5) such that the oil reservoir portion (53), the weir portions (53a), and the opening portion (51) are arranged in this order from a ring gear (6) side in the axial direction.

Consequently, it is possible to secure a sufficient volume of the oil reservoir portion.

The weir portions may include a first weir portion (53a) disposed on an opening portion (51) side of the oil reservoir portion (53) and a second weir portion (53b) disposed on the ring gear (6) side of the oil reservoir portion (53).

Further, the differential case (5) may include a guide portion (55) that guides the lubricating oil in the oil reservoir portion (53) toward the oil introduction port (54) on an opposite side of the ring gear (6) side by gradually narrowing the oil reservoir portion (53) as the oil reservoir portion (53) extends away from the ring gear (6) in the axial direction, and the oil introduction port (54) may be formed in the seat surface (52) so as to be proximate to a center of the seat surface (52) in the axial direction.

Consequently, it is possible to supply hydraulic oil that serves as lubricating oil to the periphery of the pinion gears, the pinion washers, and the seat surfaces through the oil introduction port by smoothly introducing hydraulic oil in the oil reservoir portions to the oil introduction port through rotation of the differential case. By offsetting the oil introduction port from the center of the oil reservoir portions in the axial direction of the differential case toward the opposite side of the ring gear side in the axial direction and forming the oil introduction port in the seat surface so as to be proximate to the center of the seat surface in the axial direction, the differential case can be rendered compact, compared to the case where the oil introduction port is proximate to the center of the oil reservoir portions, while efficiently supplying hydraulic oil to the seat surface and securing a sufficient area of the opening portions.

It should be understood that the invention according to the present disclosure is not limited to the embodiment described above in any way, and that various modifications may be made within the scope of the extension of the present disclosure. Furthermore, the embodiment described above is merely one specific embodiment of the disclosure described in the SUMMARY OF THE DISCLOSURE, and does not limit the elements of the invention described in the SUMMARY OF THE DISCLOSURE.

INDUSTRIAL APPLICABILITY

Aspects according to the present disclosure can be used in the differential gear manufacturing industry etc.

The invention claimed is:
1. A differential gear to be mounted on a vehicle, comprising:
 a pair of side gears;
 at least two pinion gears meshed with the side gears;
 a differential case that houses the side gears and the at least two pinion gears,
 a ring gear is fixed to the differential case, lubricating oil being supplied to and discharged from an inside of the differential case via an opening portion;

a pinion washer is disposed between a back surface of each of the pinion gears and the seat surface; and an oil introduction port is formed in each of the seat surfaces, the oil introduction port communicating with the oil reservoir portion on a front side in the rotational direction of the differential case at a time when the vehicle travels forward and at least partially overlapping the pinion washer as seen in an axial direction of the pinion gear, wherein the differential case includes at least two seat surfaces formed on an inner peripheral surface of the differential case so as to support the pinion gears, weir portions provided between the adjacent seat surfaces and extending in a direction along a rotational direction of the differential case to connect between the adjacent seat surfaces, and an oil reservoir portion formed on the inner peripheral surface by the weir portions so as to be positioned on an opposite side, in an axial direction of the differential case, of the opening portion from the weir portions, the differential case includes a guide portion that guides the lubricating oil in the oil reservoir portion toward the oil introduction port on an opposite side of the ring gear side by narrowing the oil reservoir portion as the oil reservoir portion extends away from the ring gear in the axial direction, and the oil introduction port is formed in the seat surface so as to be proximate to a center of the seat surface in the axial direction.

2. The differential gear according to claim 1, wherein:

the oil reservoir portion is formed such that the oil reservoir portion, the weir portions, and the opening portion are arranged in this order from a ring gear side in the axial direction.

3. The differential gear according to claim 2, wherein the weir portions include a first weir portion disposed on an opening portion side of the oil reservoir portion and a second weir portion disposed on the ring gear side of the oil reservoir portion.

* * * * *